Dec. 25, 1956 J. L. DE KROES ET AL 2,775,726

APPARATUS FOR REGISTERING PULSES

Filed Nov. 1, 1951

INVENTORS
Alphonsus Heetman
Jan Louis De Kroes
By [signature] Agent

United States Patent Office 2,775,726
Patented Dec. 25, 1956

2,775,726

APPARATUS FOR REGISTERING PULSES

Jan Louis de Kroes and Alphonsus Heetman, Hilversum, Netherlands, assignors to Hartford National Bank and Trust Company, Hartford, Conn., as trustee Application November 1, 1951, Serial No. 254,242

Claims priority, application Netherlands November 6, 1950

1 Claim. (Cl. 317—140)

Figure 1:
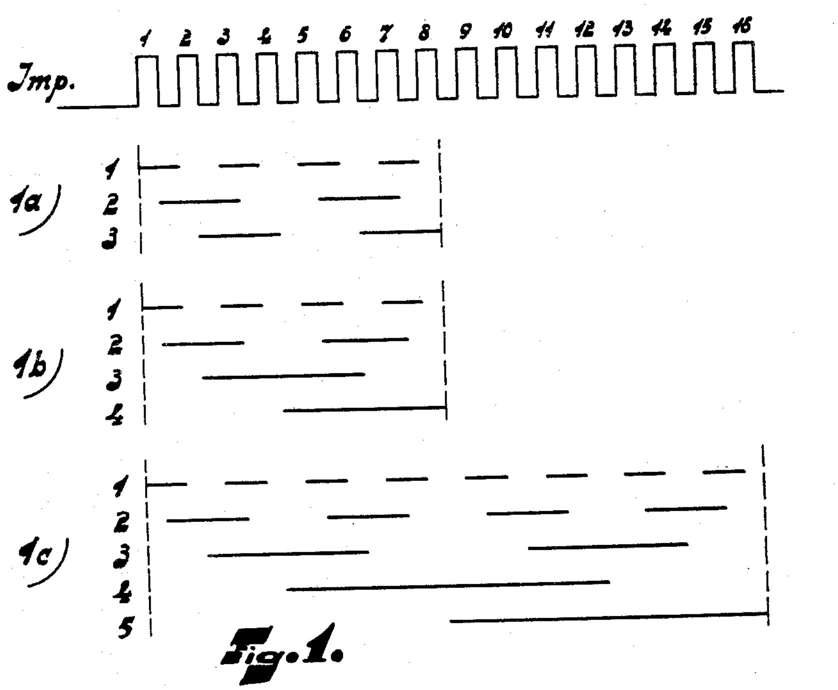

The invention relates to a method of registering pulses by means of a counting relay circuit-arrangement.

Relay circuit-arrangements are already known in which a number of pulses supplied to the counting circuit can be registered in the form of a combination of energized conditions of counting relays, the combination being characteristic of this number. Such counting circuits are used inter alia in registers of automatic telephone systems for the temporary recording of the dial pulses emitted by a subscriber and for the re-emission of an equal number of pulses or a number of pulses derived therefrom. Such circuit-arrangements are furthermore used for marking the outlets of selectors in systems comprising a common control-device or for producing other numerical criteria, for example direct voltages, the value of which is characteristic of the number of incoming pulses.

In the known circuit-arrangements, as a rule, the pulses are registered in the binary system, i. e. a first relay registers the number of units, a second relay the number of doubles, a third relay the number of quadruplets of the incoming digit. However, this method requires a comparatively high number of relays, since these circuit-arrangements are such that, with doubling of the number of pulses that must be registerable at the most, the number of relays must be raised by two, so that the registration of $2^n$ pulses requires $2^n$ pulses relays. A further circuit-arrangement is known which permits of registering a maximum number of $2^n$ pulses by means of $n$ relays. However, the operation of this circuit-arrangement is not very reliable under any circumstances. This circuit-arrangement has a limitation in that magnetizing or demagnetizing of a relay must be carried out through discharge of a capacitor.

The invention is based on the recognition that $2^n$ different energizing conditions can be distinguished with the use of $n$ relays, since each relay may be in one of two conditions, i. e. energized and not energized. Each pulse requires two conditions, since at the beginning and at the end of each pulse a variation in condition is required for the circuit to be insensitive for the duration of a pulse. In this case a maximum of $2^{n-1}$ pulses can be counted with the use of $n$ relays. Consequently the registration of 16 pulses requires 5 relays.

In the method according to the invention the circuit comprises $n$ counting relays, in which $n$ is equal to 3 or more. The method is characterized in that the order of succession in which the relays are energized is such (starting from the condition in which all relays are idle) that a relay having the ordinal numeral 1 is energized from the beginning of each odd-numbered pulse till the beginning of each even-numbered pulse and that a relay having the ordinal numeral $p$ (where $p$ is different from 1 and $n$) is energized at the end of the $2^{p-2}$ pulse and changes its energizing condition at the end of each $2^{p-1}$ pulse and that the relay having the ordinal numeral $n$ is energized at the end of the $2^{n-2}$ pulse and changes its energizing condition after each $2^{n-2}$ pulse or else that the series of energizing conditions is followed in the negative sense.

The method is such that all practicable energizing conditions of the relays occur in succession, while the energizing condition of only one relay changes at the beginning and at the end of each pulse. This implies that in addition to the counting relay proper, the energizing condition of which gives an indication about the number of incoming pulses, no auxiliary relays are required, as is the case in known counting circuits.

If at the beginning or at the end of a pulse two or more relays would change their conditions, these changes will not take place exactly simultaneously in practice and, so that it is not certain which relay will change its condition first which will create a situation of uncertainty. If one relay changes faster or sooner than the other, a condition is passed in which the energizing condition of the relays corresponds to a particular number of pulses not equal to the real number of incoming pulses. Therefore, the known circuit-arrangements comprise auxiliary relays which bridge the conditions of uncertainty. By the method according to the invention the number of relays can be reduced to a minimum.

A circuit-arrangement which is particularly suitable for carrying out this method is such that a terminal of a supply source is connected through a first contact of the pulse number, by means of which pulses may be fed to the circuit, to a first circuit of series-connected break-contacts of the relays, with the exception of one, the next of the break contacts in this circuit determining the order of succession, one end of a first winding of the first relay of the order of succession being connected through a second contact of a pulse member, this contact switching in a sense opposite to that of the first contact, to the said terminal of the supply source, while one end of a first winding of the further relays are connected each through a make contact of the preceding relay in the order of succession to the side of the break contact of this relay in the first circuit which is remote from the pulse member, the other end of the first winding of the first relay being connected to an inlet of a second circuit, in which in the given order break contacts of the second and the next following relays are included in series and furthermore connected through a make contact of a second relay to the inlet of a third circuit, in which in the given order break contacts of the third and the next following relays are included in series, the ends of the break contacts of each relay included in the second and the third circuit are connected crosswise through make contacts of the associated relays, the other ends of the first windings of the second relay and the next following relay being connected to the end of the break contact of the corresponding relay in the second circuit, which ends are remote from the inlet of the second circuit, the ends of the second and the third circuits remote from the inlet being connected to relatively different terminals of the supply source, each energized relay completing a holding circuit for itself through its own make contact.

The term "contact of a relay" is to be understood to mean an electric dipole, with which, under the control of the relay, a connection is established or interrupted between the terminals with a break contact a connection is established between the terminals of a relay in the position of rest, this connection being interrupted when the relay is energized. Conversely, the term "make contact" is understood to mean a contact of which the terminals of the relay are interconnected only when the relay is energized. In view of the operation of the circuit-arrangement it is immaterial to which terminal the moving part of the contact member is connected.

An important advantage of the circuit-arrangement is that it may be arranged in a simple manner to be such that pulses can be registered both in an additive and in a subtractive sense. This is particularly of importance, if it is required to re-emit a number of pulses equal to the number of incoming pulses. In this case, after the pulses to be registered are recorded, the circuit is moved into a condition in which it can count back, after which pulses, which may, for example, be taken from a standard pulse generator, are supplied to the circuit until a particular initial condition, for example, the condition in which all the relays are at rest, is reached. The circuit-arrangement may be extended without drastic modifications by adding one or more relays.

In order that the invention may be more clearly understood and readily carried into effect, it will now be described more fully with reference to the accompanying drawing.

Figure 2:
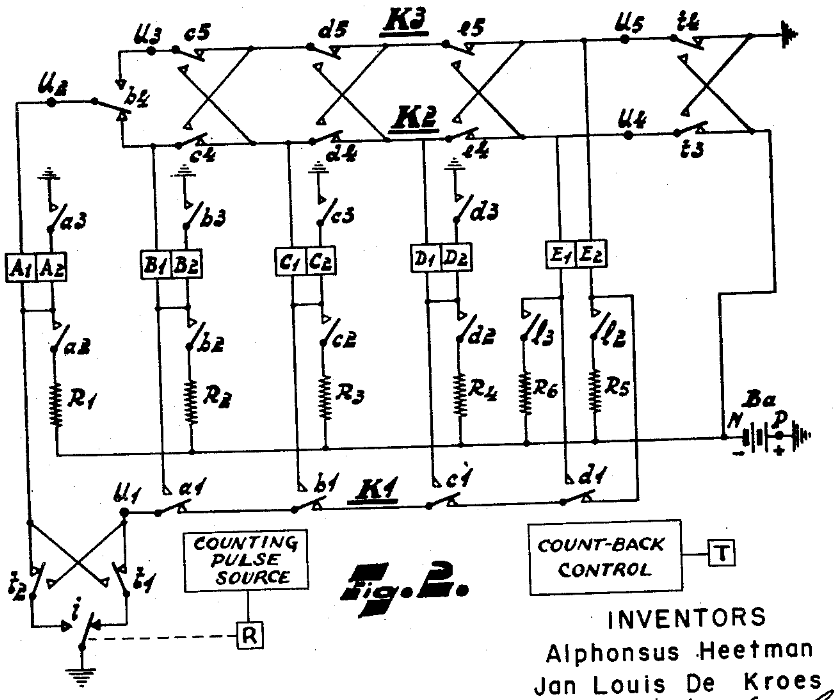

In the drawing:

Fig. 1 is a graph illustrative of the operation of pulse registering apparatus in accordance with the invention; and Fig. 2 is a schematic circuit diagram of a preferred embodiment of a pulse registering apparatus in accordance with the invention.

Fig. 1 illustrates the order of succession in which the relays are energized in the method according to the invention. The pulses supplied are indicated at *Imp.* Figs. 1*a*, 1*b* and 1*c* relate to counting circuits comprising 3, 4 5 relays respectively. With each circuit the series of energized conditions may, in principle, occur both from the left to the right and in the inverse direction, one direction corresponding, for example, to the registration in an additive sense, the other to the registration in a subtractive sense.

If the series is followed from the left to the right, the first relay is energized from the beginning of an odd-numbered pulse till the beginning of the next following even-numbered pulse. The second relay is energized from the end of the first pulse till the end of the third pulse, from the end of the fifth pulse till the end of the seventh pulse, and so forth. The variations of the energized conditions of the third relay are not equal in the circuit comprising three relays to those in the circuits comprising four or more relays. In the circuit comprising three relays the third relay is energized from the end of the second pulse till the end of the fourth pulse, from the end of the sixth pulse till the end of the eighth pulse, and so forth, if the cycle is followed from the left to the right and the cycle is repeated after series of four pulses. On the contrary, in a circuit comprising four or more relays, the third relay remains energized until the end of the sixth pulse.

In a circuit comprising $n$ relays, the energizing condition of the relays with the exception of the last relay, is in general, symmetrical relative to the end of the $2^{n-1}$th pulse. The cycle of the circuit comprising $n$ relays may be derived from that of a circuit comprising $n-1$ relays by reflecting the cycle of each relay of the latter circuit with respect to the end of this cycle. Then the $n$th relay is energized for the second half of the cycle with $n$ relays. It should be noted that at the beginning and at the end of each pulse only one relay changes its energizing condition.

Fig. 2 shows one embodiment of a circuit comprising 5 relays. This circuit permits of registering 16 pulses. The 5 relays A, B, C, D and E are shown in the figure by their two windings $A_1A_2$, $B_1B_2$, $C_1C_2$, $D_1D_2$ and $E_1E_2$. The energizing current for the relays is supplied by a battery B*a*, of which the positive terminal P is grounded. The counting pulses are supplied to the circuit by means of a pulse change-over contact $i$ of a relay R. The arrangement comprises three circuits $K_1$, $K_2$ and $K_3$ of series-connected break-contacts of the relays. The change-over contacts $a_1$, $b_1$, $c_1$ and $d_1$ of the relays A, B, C and D form a chain circuit, of which the series-connected break-contacts constitute the circuit $K_1$. The inlet $U_1$ thereof is grounded through a break-contact $i$ and a break-contact $t_1$ of a relay T (not shown). The ends of first windings $B_1$, $C_1$, $D_1$ and $E_1$ of the relays B, C, D and E are connected to the make-contact of the chain circuit. Between an end of a first winding $A_1$ of relay A and ground are connected the break-contact $t_2$ of relay T and the make-contact $i$ of the pulse member. The other end of the winding $A_1$ is connected to the inlet $U_2$ of a second circuit $K_2$. This circuit is constituted by the series-connection of the break-contacts $b_4$, $c_4$, $d_4$ and $e_4$ of the relays B, C, D and E. The other ends of the windings $B_1$, $D_1$, $C_1$ and $E_1$ are connected to the ends of the break-contacts of the associated relays of this circuit, these ends being remote from the inlet $U_2$. The other end of the circuit $K_2$ is connected through the break-contact $t_3$ of relay T to the negative terminal N of the battery. The inlet $U_2$ of the circuit $K_2$ is connected through the make-contact $b_4$ of relay B to the inlet $U_3$ of the third circuit $K_3$, of which the other end is grounded through break-contact $t_4$ of relay T. The circuit $K_3$ is constituted by the series-connection of the break-contacts $c_5$, $d_5$ and $e_5$ of relays C, D and E. The ends of the break-contacts $c_4$ and $c_5$, $d_4$ and $d_5$, $e_4$ and $e_5$ and $t_3$ and $t_4$, associated with the same relay, are connected cross-wise by make-contacts $c_4$ and $c_5$, $d_4$ and $d_5$, $e_4$ and $e_5$, $t_3$ and $t_4$, respectively, of the corresponding relays. The pairs of change-over contacts $c_4$ and $c_5$ and so forth thus form a commutator. The relays are provided with second windings $A_2$, $B_2$, $C_2$, $D_2$ and $E_2$, through which, if the relay is energized, in series with its own make-contacts $a_2$ and $a_3$, $b_2$ and $b_3$, $c_2$ and $c_3$, $d_2$ and $d_3$, $e_2$ and $e_3$ and with a resistor $R_1$, $R_2$, $R_3$, $R_4$, $R_5$ and $R_6$ respectively a holding circuit for the relay is completed.

The circuit-arrangement operates as follows:

In the position of rest all the relays are deenergized. At the beginning of the first pulse the pulse contact $i$ completes an energizing circuit for relay A from ground through contact $i$ off, $t_2$ off, winding $A_1$, contact $b_4$ off, circuit $K_2$, contact $t_3$ off to battery B*a*. The term contact $i$ up, $t_2$ off is to be understood to mean here the make-contact $i$, the break-contact $t_2$ and so forth. Relay A completes a holding circuit for itself through contact $a_3$ up, its second winding $A_2$, contact $a_2$ up, resistor $R_1$.

At the end of the first pulse relay B is energized in a circuit from ground through contact $i$ off, $t_1$ off, $a_1$ on, winding $B_1$, contact $c_4$ off, $d_4$ off, $e_4$ off, $t_3$ off to the negative terminal N of the battery. Relay B completes a holding circuit for itself in a manner similar to that of relay A and of the relays to be energized afterwards through a second winding $B_2$, this holding circuit being here completed through contact $b_3$ up, winding $B_2$, contact $b_2$ up, resistor $R_2$. Relay B then changes over the armature of its change-over contact $b_4$, so that at the beginning of the second pulse the winding $A_1$ of relay A is short-circuited through contact $b_4$ up, $c_5$ off, $d_5$ off, $e_5$ off, $t_4$ off, $i$ up and $t_2$ off, while furthermore winding $A_2$ is short-circuited through contact $a_3$ up, $i$ up and $t_2$ off, the relay A falling off. The resistor $R_1$ here prevents the battery from being short-circuited until make-contact $a_2$ opens.

At the end of the second pulse relay C is energized through contact $i$ off, $t_1$ off, $a_1$ off, $b_1$ up, winding $C_1$, contact $d_4$ off, $e_4$ off and $t_3$ off.

At the beginning of the third pulse make-contact $i$ completes an energizing circuit for relay A through contact $i$ up, $t_2$ off, winding $A_1$, contact $b_4$ up, $c_5$ up, $d_4$ off, $e_4$ off and $t_3$ off.

Relay B is deenergized at the end of the third pulse owing to the short-circuit of winding $B_1$ through contact $c_4$ up, $d_5$ off, $e_5$ off, $t_4$ off, $i$ off, $t_1$ off and $a_1$ up and the winding $B_2$ through contact $b_3$ up, $i$ off, $t_1$ off and $a_1$ up.

At the beginning of the fourth pulse relay A is denergized owing to the short-circuit of winding $A_1$ through contact $b_4$ off, $c_4$ up, $d_5$ off, $e_5$ off, $t_4$ off, $i$ up and $t_2$ off.

At the end of this pulse relay D is energized through contact $i$ off, $t_1$ off, $a_1$ off, $b_1$ off, $c_1$ up, winding $D_1$, contact $e_4$ off and $t_3$ off.

At the beginning of the fifth pulse relay A is energized through contact $i$ up, $t_2$ off, winding $A_1$, contact $b_4$ off, $c_4$ up, $d_5$ up, $e_4$ off and $t_3$ off. At the end of this pulse relay B is energized through contact $i$ off, $t_1$ off, $a_1$ up, winding $B_1$, contact $c_4$ up, $d_5$ up, $e_4$ off, and $t_3$ off.

Relay A is deenergized at the beginning of the sixth pulse owing to the short-circuit of winding $a_1$ through contact $b_4$ up, $c_5$ up, $d_4$ up, $e_5$ off, $t_4$ off, $i$ up and $t_2$ off. At the end of this pulse relay $c$ is also deenergized, since its winding $C_1$ is short-circuited through contact $d_4$ up, $e_5$ off, $t_4$ off, $i$ off, $t_1$ off, $a_1$ off and $b_1$ up the winding $C_2$ being at the same time short-circuited.

At the beginning of the seventh pulse relay A is again energized through contact $i$ up, $t$ off, winding $A_1$, contact $b_4$ up, $c_5$ off, $d_5$ up, $e_4$ off and $t_3$ off.

At the end of this pulse relay B is deenergized owing to the short-circuit of its winding $B_1$ through contact $c_4$ off, $d_4$ up, $e_5$ off, $t_4$ off, $i$ off, $t_1$ off and $a_1$ up and of its winding $B_2$.

At the beginning of the eighth pulse relay A is deenergized owing to the short-circuit of its winding $A_1$ through contact $b_4$ off, $c_4$ off, $d_4$ up, $e_5$ off, $t_4$ off, $i$ up and $t_2$ off and of winding $A_2$.

At the end of this pulse relay E is energized through contact $i$ off, $t_1$ off, $a_1$ off, $b_1$ off, $c_1$ off and $d_1$ up, winding $E_1$ and contact $t_3$ off.

At the beginning of the ninth pulse relay A is energized through contact $i$ up, $t_2$ off, winding $A_1$, contact $b_4$ off, $c_4$ off, $d_4$ up, $e_5$ up and $t_3$ off. Relay B is energized at the end of the ninth pulse through contact $i$ off, $t_1$ off, $a_1$ up, winding $B_1$, contact $c_4$ off, $d_4$ up, $e_5$ up and $t_3$ off.

At the beginning of the tenth pulse relay A is deenergized owing to the short-circuit of its winding A through contact $b_4$ up, $c_5$ off, $d_5$ up, $e_4$ up and $t_4$ off, $i$ up and $t_2$ off and of winding $A_2$.

At the end of the tenth pulse relay C is energized through contact $i$ off, $t_1$ off, $a_1$ off, $b_1$ up, winding $C_1$, contact $d_4$ up and $e_5$ up and $t_3$ off.

Relay A is energized at the beginning of the eleventh pulse through contact $i$ up, $t_2$ off, winding $A_1$, contact $b_4$ up, $c_5$ up, $d_4$ up, $e_5$ up and $t_3$ off.

At the end of the eleventh pulse winding $B_1$ is short-circuited through contact $c_4$ up, $d_5$ up, $e_4$ up, $t_4$ off, $i$ off, and $t_1$ off, $a_1$ up, so that relay B is deenergized.

At the beginning of the twelfth pulse winding $A_1$ is short-circuited through contact $b_4$ off, $c_4$ up, $d_5$ up, $e_4$ up, $t_4$ off, $i$ up, $t_2$ off. At the end of this pulse relay D is deenergized owing to the short-circuit of winding $D_1$ through contact $e_4$ up, $t_4$ off, $i$ off, $t_1$ off, $a_1$ off, $b_1$ off, and $c_1$ up.

At the beginning of the thirteenth pulse relay A is energized through contact $i$ up, $t_2$ off, winding $A_1$, contact $b_4$ off, $c_2$ up, $d_5$ off, $e_5$ up and $t_3$ off. At the end of this pulse relay B is energized through contact $i$ off, $t_1$ off, $a_1$ up, winding $B_1$, contact $c_4$ up, $d_5$ off, $e_5$ up, $t_3$ off, $i$ off, $t_1$ off and $a_1$ up.

At the beginning of the fourteenth pulse winding $A_1$ is short-circuited through contact $b_4$ up, $c_5$ up, $d_4$ off, $e_4$ up, $t_4$ off, $i$ up and $t_2$ off. At the end of this pulse winding $C_1$ of relay C is also short-circuited through contact $d_4$ off, $e_4$ up, $t_4$ off, $i$ off, $t_1$ off, $a_1$ off, $b_1$ up.

At the beginning of the fifteenth pulse relay A is energized through contact $i$ up, $t_2$ off, winding $A_1$, contact $b_4$ up, $c_5$ off, $d_5$ off, $e_5$ up, and $t_3$ off. At the end of this pulse winding $B_1$ is short-circuited through contact $c_4$ off, $d_4$ off, $e_4$ up, $t_4$ off, $i$ off, $t_1$ off and $a_1$ up.

At the beginning of the sixteenth pulse relay A is demagnetized owing to the short-circuit of its winding $A_2$ through contact $b_4$ off, $c_4$ off, $d_4$ off, $e_4$ up, $t_4$ off, $i$ up and $t_2$ off. At the end of this pulse relay E is deenergized as the last relay, since its winding $E_2$ is short-circuited through contact $t_4$ off, $i$ off, $t_1$ off, $a_1$ off, $b_1$ off, $c_1$ off, $d_1$ off.

The circuit-arrangement may be moved, in a state, from any state into a condition in which pulses are counted back, i. e. the series of energizing conditions is followed in an opposite sense by energizing the relay T so that the commutator contacts $t_1$, $t_2$, $t_3$ and $t_4$ change over.

If, for example, four pulses are received, relays A, B and E are in the position of rest and relays C and D are energized. After relay T has been energized, the pulse member I again supplies pulses to the circuit, this member being, for example, controlled by a standard pulse generator.

At the beginning of the first counting-back pulse relay D is deenergized, since its winding $D_1$ is short-circuited through contact $e_4$ off, $t_3$ up, $i$ up, $t_2$ up, $a_1$ off, $b_1$ off, and $c_1$ up, winding $D_2$ being short-circuited through contact $d_3$ up, $i$ up, $t_2$ up, $a_1$ off, $b_1$ off and $c$ up. At the end of the first pulse relay A is energized through contact $i$ off, $t_1$ up, winding $A_1$, contact $b_4$ off, $c_4$ up, $d_5$ off, $e_5$ off, and $t_4$ up.

At the beginning of the second pulse relay B is deenergized through contact $i$ up, $t_2$ up, $a_1$ up, winding $B_1$, contact $c_4$ up, $d_5$ off, $e_5$ off and $t_4$ up. At the end of the second pulse relay A is de-energized owing to the short-circuit of its winding $A_2$ and of its winding $A_1$ through contact $b_4$ up, $c_5$ up, $d_4$ off and $e_4$ off, $t_3$ up, $i$ up, and $t_1$ up.

At the beginning of the third pulse relay C is deenergized, at the end of the third pulse relay A is energized, at the beginning of the fourth pulse relay B is de-energized and at the end of this pulse relay A is also de-energized, so that all the relays have been deenergized and the circuit-arrangement again takes up its position of rest.

The circuit-arrangement may be modified in various ways within the scope of the invention. In the circuit-arrangement described, a relay is demagnetized for short-circuiting its windings. As a matter of course, a relay may, as an alternative be deenergized by counter-magnetization through the main winding, which may, for example, be carried out by connecting the pulse member not to earth, but to a suitable potentiometer of the battery. The connection between the two windings of the relays may then be dispensed with.

What we claim is:

Apparatus for registering pulses comprising a voltage source having two terminals, a pulsing member responsive to incoming sequential pulses and including a connecting element and first and second contacts alternately engaged by said element in response to an applied pulse, said element being connected to one terminal of said source, a series of at least three relays each provided with a winding and first, second and third switches actuated thereby, each switch having a connecting arm and make and break contacts engaged thereby, means serially connecting the arms through the associated break contacts in the first switches of all relays in said series except the last thereof between one end of the winding of said last relay and the first contact of said pulsing member, the second contact of said pulsing member being connected to one end of the winding of the first relay in said series, means serially connecting the arms through the associated break contacts of the second switches in all relays in said series except the first thereof between the other end of the winding of said first relay and the other terminal of said source, means serially connecting the arms through the associated break contacts of the third switches in all relays in said series except the first and second thereof between the make contact of the second switch in said second relay and said one terminal of said source, the winding of each of said relays except said first relay being connected between the break contact in the corresponding second switch and the make contact of the first switch associated with the preceding relay in the series, means cross-coupling the make contacts of the second and third switches to the break contacts of the second and third switches associated with all the relays in the series except the first and second thereof, and holding circuit means in conjunction with each relay in said series.

References Cited in the file of this patent

UNITED STATES PATENTS

| | | |
|---|---|---|
| 2,389,275 | Rayner | Nov. 20, 1945 |
| 2,397,604 | Hartley | Apr. 2, 1946 |
| 2,444,042 | Hartley | June 29, 1948 |
| 2,417,831 | Kinkead | Mar. 25, 1947 |
| 2,549,769 | Bray | Apr. 24, 1951 |
| 2,561,073 | Schowten | July 17, 1951 |

OTHER REFERENCES

AIEE Technical Paper, September 1951, 51–530, "Relay Counting Chains Codes and Translations in Dial Pulse, Register Circuits," by R. M. M. Oberman.